United States Patent [19]

Hallet et al.

[11] Patent Number: 5,439,272
[45] Date of Patent: Aug. 8, 1995

[54] SEAT FOR A VEHICLE PROVIDED WITH A SAFETY BELT WITH FIXATION POINTS EMBARKED ON THE ARMATURE OF THE SEAT

[75] Inventors: Michel Hallet, Clinchamps; Frédéric Degrenne, Ste Honorine la Chardonne, both of France

[73] Assignee: Bertrand Faure Automobile, Bois D'Arcy, France

[21] Appl. No.: 61,840

[22] Filed: May 14, 1993

Related U.S. Application Data

[63] Continuation-in-part of Ser. No. 634,097, Dec. 26, 1990, abandoned.

[30] Foreign Application Priority Data

Dec. 26, 1989 [FR] France .................. 89 17177

[51] Int. Cl.⁶ ............................................ B60R 21/00
[52] U.S. Cl. .................................. 297/479; 297/473
[58] Field of Search .............. 297/464, 468, 473–480, 297/483; 280/801 R, 806–808, 801.1, 801.2

[56] References Cited

U.S. PATENT DOCUMENTS

| | | | |
|---|---|---|---|
| 3,418,021 | 12/1968 | Lewis | 297/479 |
| 3,439,932 | 4/1969 | Lewis et al. | 297/479 |
| 3,442,529 | 5/1969 | Lewis et al. | 297/479 |
| 3,761,127 | 9/1973 | Giese et al. | 297/475 X |
| 4,310,176 | 1/1982 | Furusawa et al. | 297/474 X |
| 5,000,283 | 3/1991 | Krieg | 297/379 X |
| 5,022,677 | 6/1991 | Barbiero | 297/485 X |

*Primary Examiner*—Kenneth J. Dorner
*Assistant Examiner*—Milton Nelson, Jr.
*Attorney, Agent, or Firm*—Robert W. Becker & Associates

[57] ABSTRACT

One end of the strap forming the safety belt is rigidly connected to a rear lower portion of the armature of the seating portion of the seat by a blockage mechanism. A shoulder keeper situated frontwardly with respect to the upper portion of the front face of the seat back provides for a sliding and guiding of a run of the safety belt passing above the passenger shoulder. An other end of the run of the safety belt is secured to an iron fitting fixed with one of the side flanges of the seating portion armature and forming a second fixation point. A keeper cooperating with a lock forms a third lower fixation point of the safety belt and is connected to the side flange opposite the second fixation point on the armature of the seating portion of the seat. The two side flanges receiving the fixed and mobile portions of the back seat inclination setting mechanisms with respect to the seating portion of the seat are placed in a position such that a pivoting point of these mechanisms is in a position which is in front of a normal pivoting point of these mechanisms by a certain distance.

4 Claims, 12 Drawing Sheets

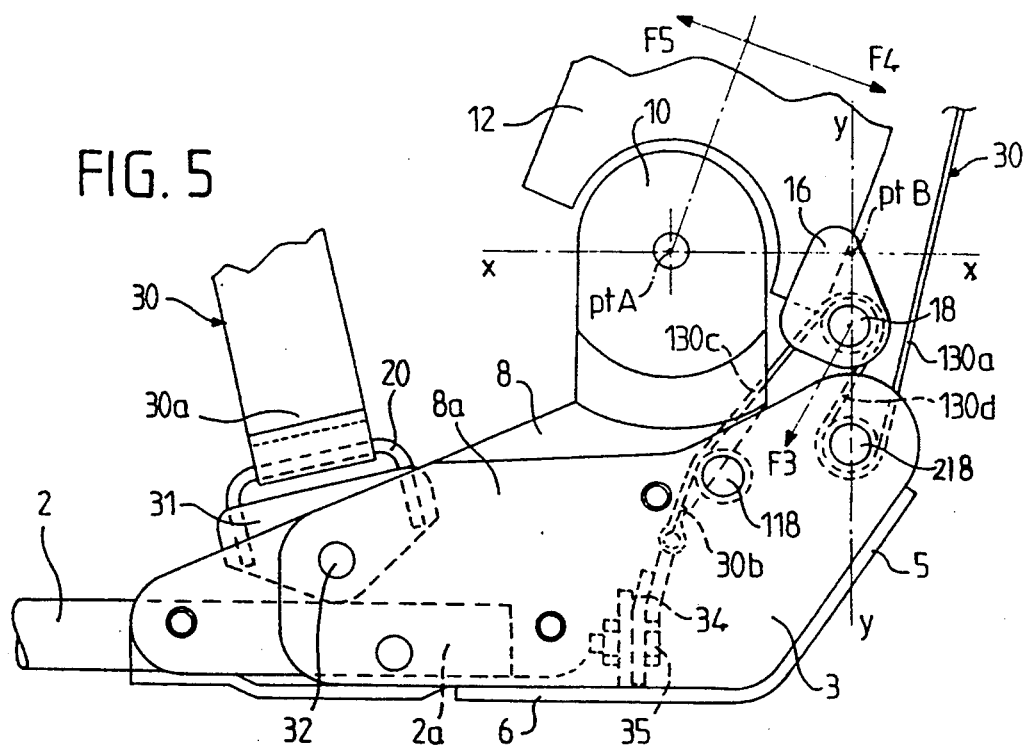
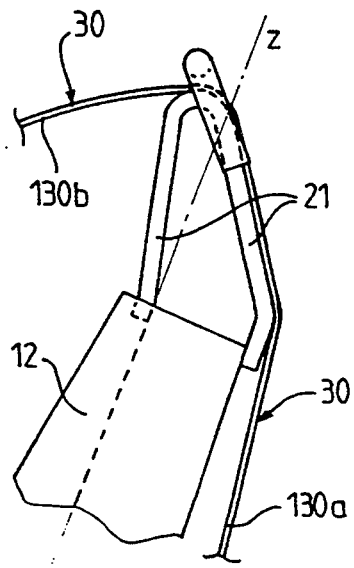
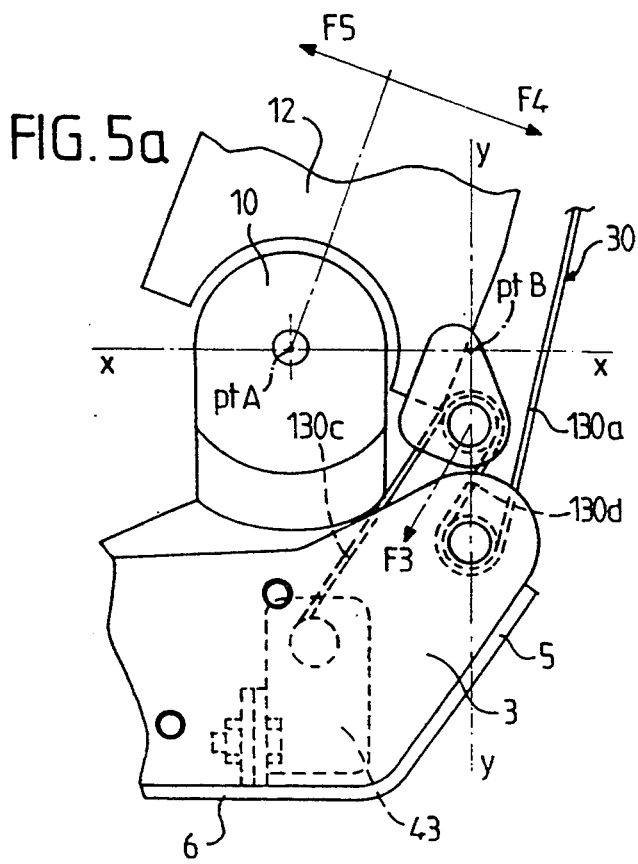

SEAT FOR A VEHICLE PROVIDED WITH A SAFETY BELT WITH FIXATION POINTS EMBARKED ON THE ARMATURE OF THE SEAT

This application is a continuation-in-part, of application Ser. No. 634,097 filed Dec. 26, 1990 and now abandoned.

FIELD OF THE INVENTION

The present invention relates to a seat for a vehicle provided with a safety belt having fixation points embarked on the armature of the seat.

BACKGROUND OF THE INVENTION

In present-day vehicles, each seat is provided with a safety belt which is of the type known as a "three point type" safety belt. This means that fixation of the strap that forms the belt is effected as follows. One end of the strap is disposed on an automatic winder that is rigidly connected to the vehicle body and forms the first fixation point. To form the second fixation point, the other end of the belt is fixed by means of a lock or buckle that is placed either on the right side or on the left side of the seat, depending on whether the seat is on the left side or on the right side. The intermediate or third fixation point, i.e. the point situated between the automatic winder and the lock, is normally also fixed to the vehicle body. Thus, the strap that forms the belt is wound on the automatic winder and extends through a keeper situated on the car body at a point thereof disposed substantially at the height of the passenger shoulder and is fixed via its other end, as indicated above, on the lower portion of the vehicle, i.e. on the car body as such, or on the frame of the seating portion of the seat.

However, these known safety belts have a disadvantage of requiring a lengthy installation, and are therefore costly to mount; they are also large (see in particular DE-A-3 429 426 and DE-A-3 613 830).

Attempts have been made to remedy these disadvantages by providing a so-called "three embarked points" safety belt, meaning that the three fixation points of the safety belt are fixed on the frame of the seating portion and of the seat back of the seat. However, one is then confronted with a major disadvantage when, as it is now the case, the inclination of the seat back can be set at will by the passenger. Actually, in this case, the articulation mechanism situated between the seating portion and the seat back are subjected to very large efforts or stresses, which can even lead to breaking of these mechanisms if an accident occurs.

Indeed, the run of the strap that passes over the shoulder and breast of the passenger in order to joint the ventral run of the strap applies, especially when there is an accident, very high stresses on the seat back which can exceed the maximum admissible stress value for the articulation mechanisms.

In addition to this major disadvantage, it has appeared that the presently known winders with automatic blockage were also not able to support such stresses and that therefore, at the moment of an impact, the safety belt does not fulfill absolutely its protection role, which aggravates the risk of bodily harm to the passenger.

OBJECT AND SUMMARY OF THE INVENTION

It is therefore an object of the present invention to provide a vehicle seat, including the seat inclination setting mechanisms, having a mounting of the safety belt with three points fixed to the seat armature (seating portion of the seat and seat back of the seat) but by using most often an automatic winder and employing means protecting the user in all cases without a risk of a too rapid destruction of the articulation mechanisms and of the automatic winder.

According to the invention, the vehicle seat provided with a safety belt having fixation points embarked on the seat armature is characterized in that one of the ends of the strap that forms the safety belt is fixedly connected to the rear lower portion of the armature of the seat seating portion of the seat via a blockage mechanism; a shoulder keeper situated frontwardly with respect to the upper portion of the front face of the seat back provides for a sliding and guiding of a run of the safety belt that passes above the passenger shoulder; another end of the run of the safety belt is secured to an iron fitting that is fixed to one of the side flanges of the seating portion armature and forms the second fixation point; a keeper that cooperates with a lock or buckle that forms the third lower fixation point of the safety belt is rigidly connected to the side flange opposite the second fixation point on the armature of the seating portion of the seat while the two side flanges receiving the fixed and mobile portions of the seat back inclination setting mechanism with respect to the seating portion of the seat are placed in a position such that a pivoting point of these mechanisms is in a position which is in front of a normal or conventional pivoting point of these mechanisms by a distance sufficient for substantially cancelling the efforts or stresses of the safety belt on these articulation mechanisms.

Various other features of the invention will become apparent from the following detailed description.

BRIEF DESCRIPTION OF THE DRAWINGS

Embodiments of the object of the invention are shown, by way of non-limiting examples, in the accompanying drawings, wherein:

FIGS. 5 and 5a are enlarged views showing a portion of the members of the safety belt according to the invention;

FIG. 6 is an enlarged elevation view showing a detail of the safety belt passing on top of the seat back;

DISCLOSURE OF PREFERRED EMBODIMENTS

Figure 1:
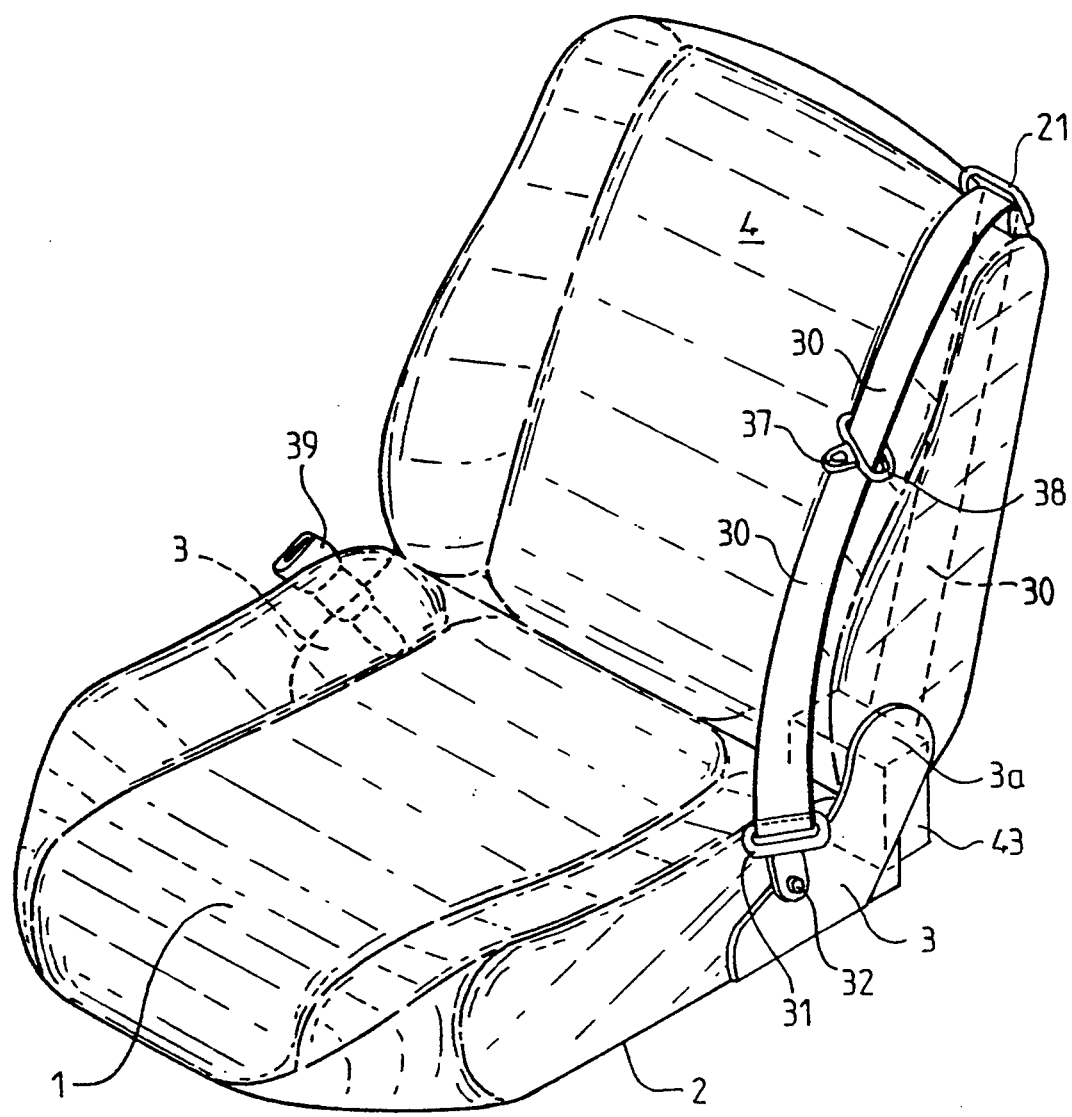
FIG. 1 is a perspective view of a seat provided with a safety belt of a "three embarked points" type on the seat armature, with the safety belt in its rest position.

Referring now to the drawings, FIG. 1 shows a vehicle seat, especially for an automobile, although the seat can also be used in other vehicles, notably in aircraft.

The seating portion 1 of the seat includes, on its armature 2, toward the rear, side flanges 3, the upper portion 3a of which is provided for receiving the fixed element of the rotation mechanism that enables the seat back 4 of the seat to be moved so as to put the seat back 4 in a desired position for using the seat. The control of this rotation device can be either manual, or motorized as is the case in the majority of modern vehicles.

Of course, the armature 2 of the seating portion of the seat is also mounted on devices that enable the longitudinal displacement of the seat, and also the variable inclination of the seating portion by using a raising device, known per se.

The seat can also comprise in some cases, in the upper portion of the seat back, a head-rest which is not shown in the present case.

Likewise, the upholstery of the seat, meaning that of the seating portion as well as of the seat back, can be made at will so as to provide as much comfort as possible for the passenger.

Figure 3:
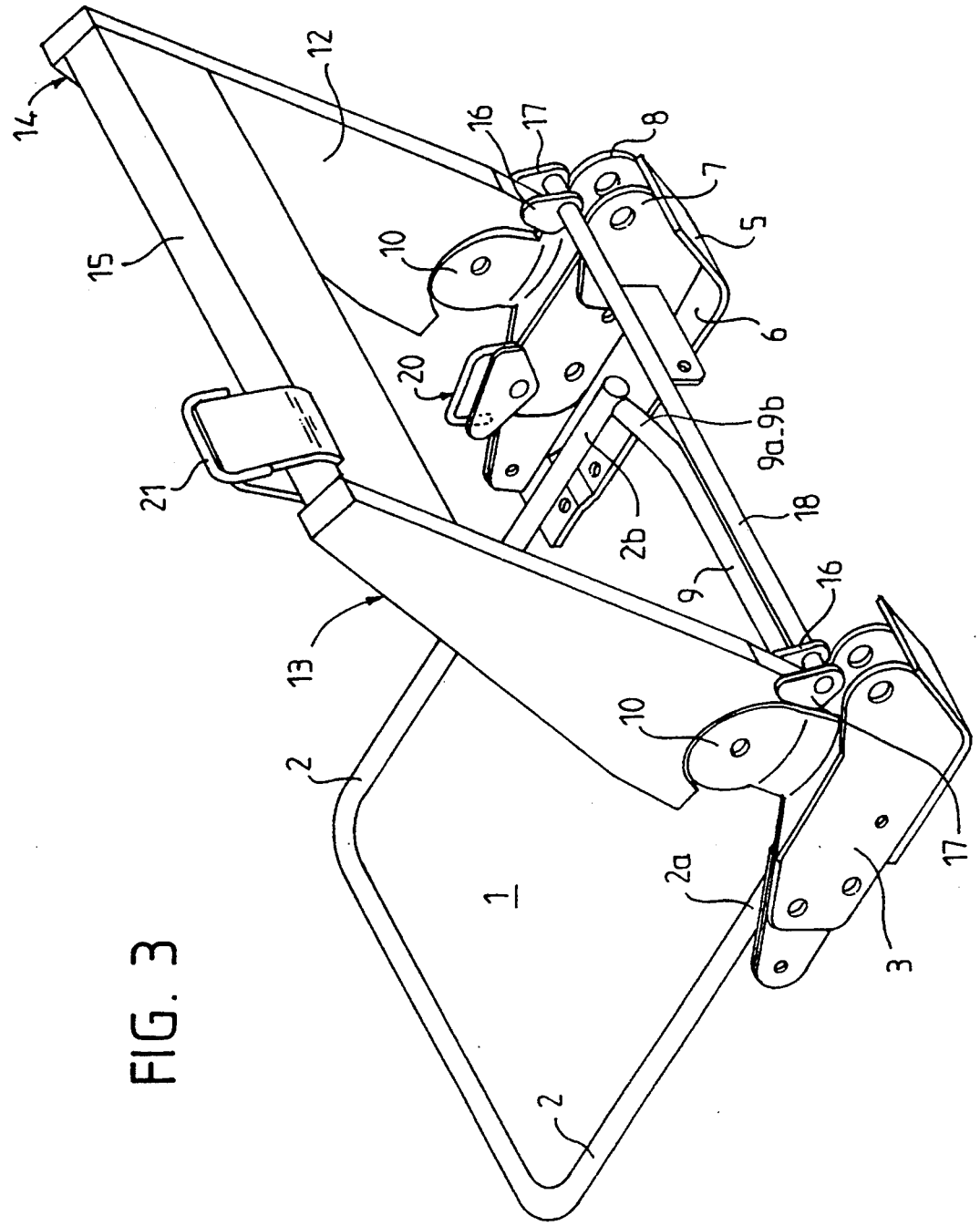
FIG. 3 is a rear perspective view of the seat without its garnishings showing the armature and the iron fittings intended for fixation of the safety belt with three embarked points.

FIG. 3 shows a rear perspective view of the armature 2 of the seating portion 1 which is made of a tube conveniently shaped. The ends 2a, 2b of the tube are fixed by any convenient means on identical supports 5 each made of a base 6 and two parallel flanges 7, 8. The latter are normally covered when the seat is finished by the covering flanges 3. The bases 6 and the flanges 7, 8 are made of a steel sheet so as to make rigid the lower rear portion of the armature of the seating portion. Moreover, this rear portion of the armature of the seating portion is reinforced by a tube 9, the ends 9a, 9b of which are fixed by any convenient means on the bases 6.

It should also be noted that the outer flange 8 of each support 5 includes an upper extension 10 on which are fixed the fixed flange of the seat back articulation mechanism and the mobile flange of this articulation device, the latter being rigidly connected to the armature 12 of the seat back 4. It should furthermore be noted that the pivot axis or point (see pt A in FIGS. 4, 5 and 5a) provided for the articulation or rotation mechanism, which allows for adjustment of the seat back 4 relative to the seating portion 1, is provided forward of a conventional pivoting point of such a setting or articulation means (see pt B in FIGS. 4, 5, 5a and 5b). This critical repositioning or decentering of the pivot axis of the seat back 4 relative to the seating portion 1 will be discussed in greater detail subsequently.

The armature 12 of the seat back 4 is made of two frames 13, 14 of a trapezoidal shape that tapers upwardly, and are connected at their top by a channel-shaped frame 15 that makes rigid the upper portion of the armature 12 of the seat back 4.

Moreover, the base of the frames 13 and 14 as well as the rear portion of the upper extensions 10 are provided with gussets 16, 17 for setting in position a hollow transverse bar (a tube) 18, the purpose of which will be explained hereafter.

Finally, there is provided on the front portion of the right support 5 in the present case, a yoke 20 intended for supporting the lock or buckle of the safety belt.

Lastly, the upper channel-shaped frame 15 of the armature 12 of the seat back 4 is provided with an iron fitting that is fixed to the upper left-hand side portion of the frame (see FIG. 3) and through which extends the upper run of the safety belt. (In this case, it is a left-hand side seat, the iron fitting 21 being on the right for a right side seat). The keeper 21 is situated in front of the front face of the seat back 4 (see FIG. 6, line Z—Z).

Figure 2:
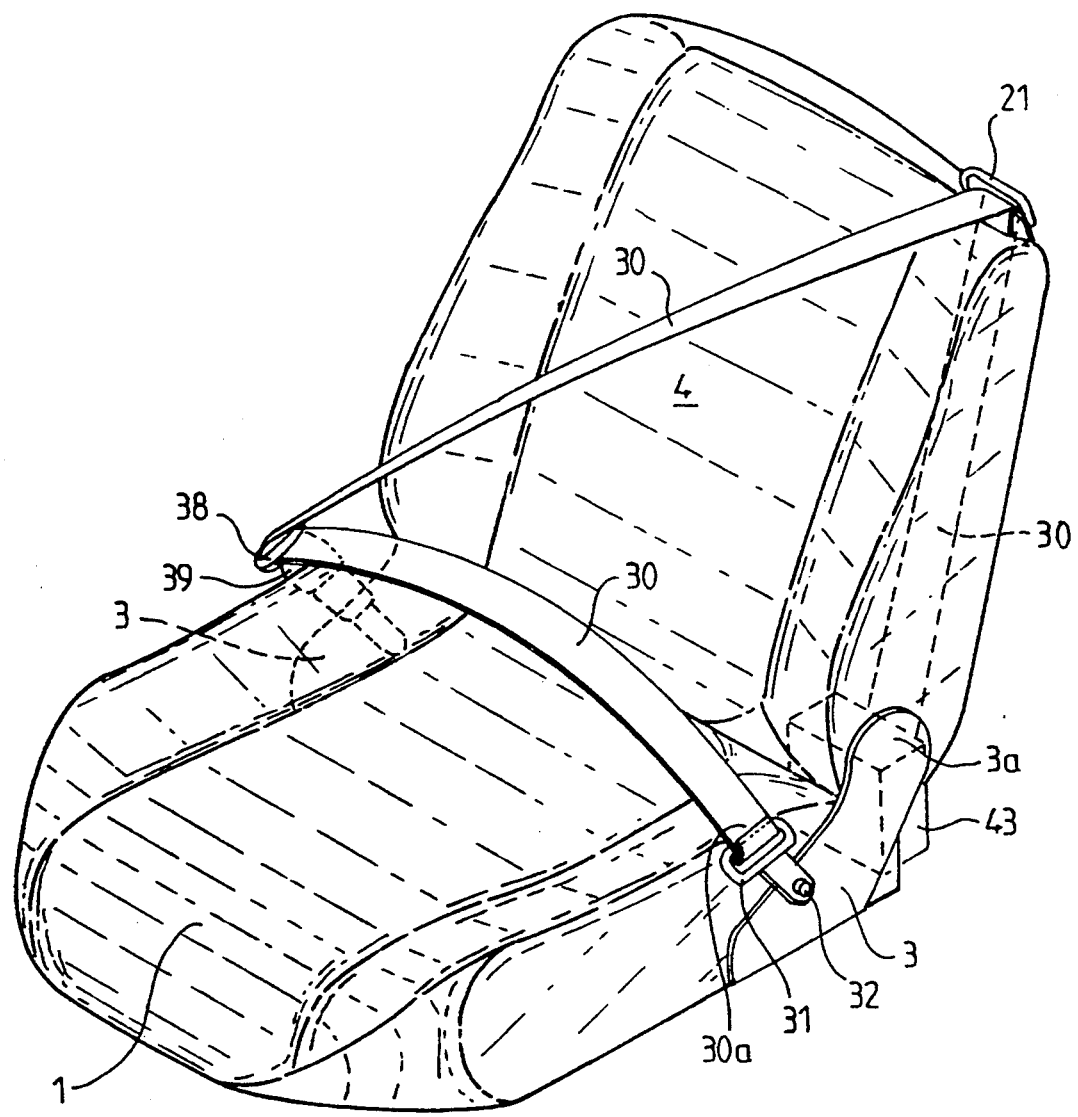
FIG. 2 is a view corresponding to FIG. 1, with the safety belt in a working position.

As shown in FIG. 2, the safety belt 30 is held at its lower free end 30a by a keeper 31 that is rigidly connected by a bolt or rivet 32 to the support 5 that carries the flanges 7 and 8.

In some cases, the flange 8 is made of two plates 8, 8a (see FIG. 5) that are rigidly connected together so as to enable a setting in position, for the other end 30b of the safety belt 30, of a fixation point 34 made by the superimposition of transverse bars retained between the supports 5, these fixation plates being connected by a bolt and nut arrangement 35, but which could also be connected together by any other suitable means.

Figure 7:
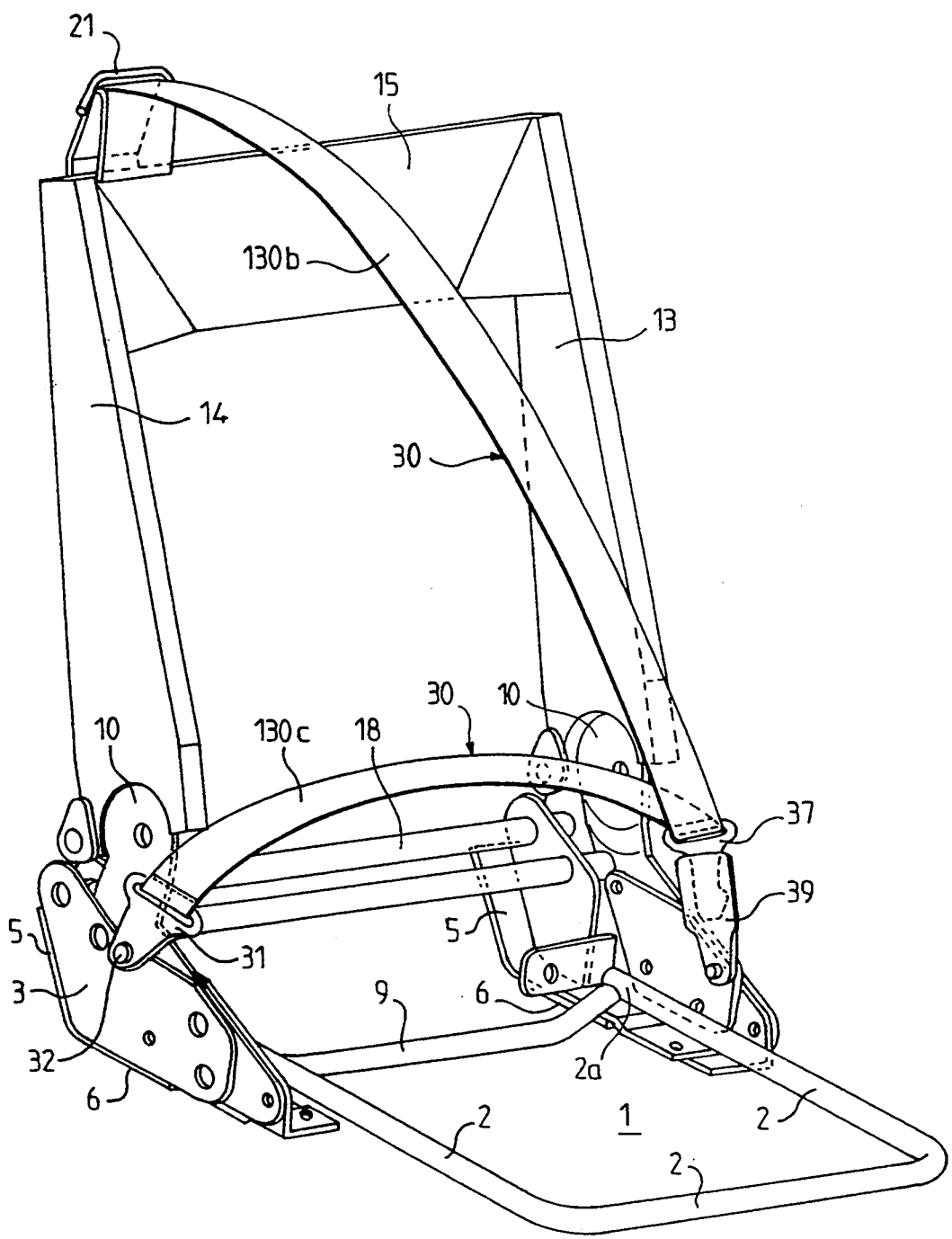
FIG. 7 is a front perspective view showing the seat armature provided with the safety belt.

As shown in FIG. 5, the lower end 30b of the belt 30 passes along a transverse tube 118 that connects the flange 8 together, then around the tube 18 fixed on the gussets 16, then returns around a tube 218 that connects the flanges 8 transversely together, and finally, extending behind the seat back 4 of the seat, slides through the upper iron fitting 21 that forms a keeper, the other end 30a of this belt being fixed on the keeper 31 as hereabove explained (FIG. 7).

It should be noted that, if we assume that the traction effort or stress applied on the strap 130a is equal to 1, due to the successive passage on the points 218, 18 and 118, the force exerted according to F3 is equal to 2. Therefore, the force F3 has a tendency to rotate the seat back armature 12 rearwardly in conformity with the arrow F4. The effect of the resultant force F3 is to cancel or minimize the rotation torque along F5 exerted on the articulation point.

The run, forming the safety belt 30, comprises a keeper 38 that is mounted freely on it and ends into a cruciform catch 37 intended for penetrating, as it is usual, inside a lock or buckle 39 for the fixation of the safety belt, since the buckle 39 is rigidly connected to the yoke 20 (see FIGS. 1, 2 and 7).

By referring to FIGS. 2 and 7, it is clear that the safety belt 30 is subdivided into three successive runs, i.e., a rear run 130a, a front breast run 130b and a ventral run 130c due to the lower fixation iron fitting 34 of the upper keeper on the back 21 of the catch 37 cooperating with the buckle 39 and finally to the fixation point having the keeper 31.

In some cases, the rear fixation point 34 is replaced (see FIG. 5a) by an automatic winder 43, known per se, and on which is normally wound the major portion of the safety belt 30 when the safety belt is not operating.

The hereabove construction leads immediately to two remarks.

Due to the fact that the articulation mechanisms that allow the angular displacement of the seat back 4 of the seat relative to the seating portion 1 thereof are displaced frontwardly of the rear end of the seating portion (point 10) since they are fixed on the upper extensions 10 of the supports 5 substantially in their median zone, there is therefore obtained a decentering of the pivot axis A of the seat back armature 12 and of the seat back 4 with respect to the seating portion 1 (see FIG. 4 where the line x—x represents the abscissa line and y—y the ordinate line), point B being the normal or conventional articulation point of the prior art (see FIG. 5b) and point A being the real pivotment point of the rotation mechanism which is situated at about 50 mm from point B in the present case. The conventional pivoting point B of FIG. 5b (for adjusting the position of a seat back relative to a seating portion) is representative of the prior art situation, for example as disclosed in U.S. Pat. No. 3,761,127, Giese et al, and in particular by the pivot axis 4 thereof. Of critical significance is the fact that the conventional pivot point B is disposed all the way at the back end, or on a bracket or flange at the back end, of the seating portion of the seat. However, to fulfill the object of the present invention of protecting the articulation mechanisms, the pivoting or articulation point A of the inventive vehicle seat is decentered, i.e. is disposed forward of a conventional pivoting point B of such articulation mechanisms, and in particular is disposed on the flange extension 10, which, rather than being disposed at the rear end of the seating portion as in the prior art, is disposed forwardly thereof, e.g. by 50 mm, which surprisingly results in a significant reduction in the amount of torque exerted by the safety belt on the articulation mechanisms. Moreover, with the keeper 21 being placed in the upper portion of the seat back 4 but on its front face, the stress of the strap making the safety belt 30 is therefore transferred above the passenger shoulder and in front with respect to the seat back 4, the result being that the torque exerted on the articulation mechanism is very small.

Actually (see FIG. 5), the force components of the rear runs 130d and 130c on the tubes 118, 18, 218 are such that an antagonist force is created and provides a torque which reduces considerably the torque exerted on the seat back articulation mechanisms.

For summarizing, the frontward position of the seat back articulation mechanisms mounted on the upper extensions 10 the position of the keeper 21 rigidly connected to the channel-shaped flange 15 in front and above the passenger shoulder, in conjunction with the lower rigid fixation of the run 130a either on a fixed point or on an automatic winder, avoid any damaging torque on the articulations, which enables making a safety belt with three embarked points.

Figure 8:
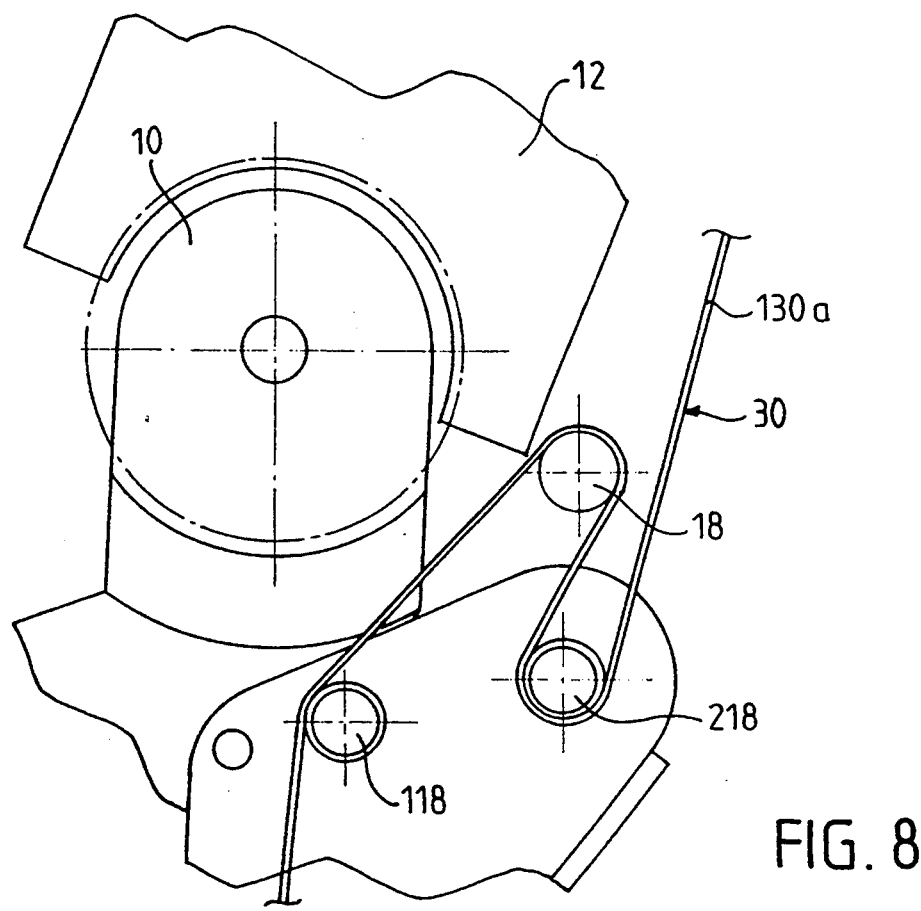
FIG. 8 is an enlarged view of a detail shown in side elevation, illustrating an alternative embodiment of a portion of the safety belt.

In FIG. 8, the lower run 130a of the belt shows another embodiment of the lower fixed point of the strap having practically the same features as hereabove as shown in FIG. 5. Actually, the throughgoing tubes 118 and 218 are rigidly connected to the armature of the seating portion of the seat, and only the return tube 18 is fixed at the bottom of the seat back, thereby limiting the stresses applied to the seat back of the seat. It can be seen that the throughgoing tubes 118, 18, 218 of the blockage mechanism are spaced apart such that they are disposed in two essentially parallel vertical planes and in three parallel horizontal planes. As can also be seen, runs of the safety belt strap enter the blockage mechanism in a first plane and exit the blockage mechanism in a second, different plane. Furthermore, the spaced-apart throughgoing tubes of the blockage mechanism can be disposed such that they form the corners of an irregular triangle, in other words a triangle that is not an equilateral triangle nor an isosceles triangle.

Figure 9:
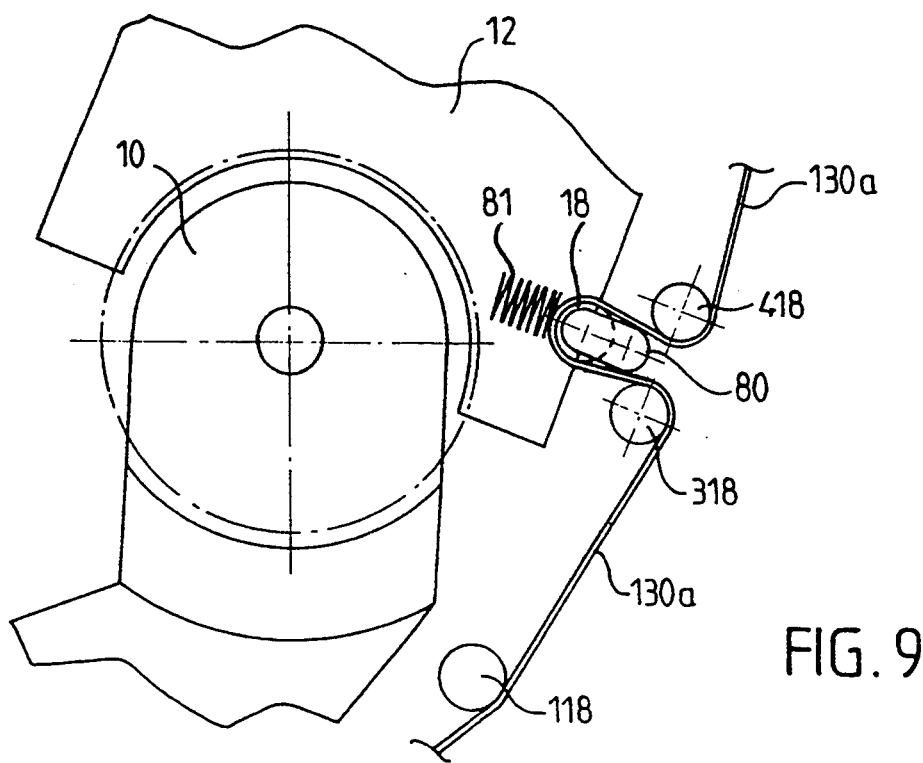
FIG. 9 is a side elevation view of a detail of another embodiment of the safety belt.
Figure 10:
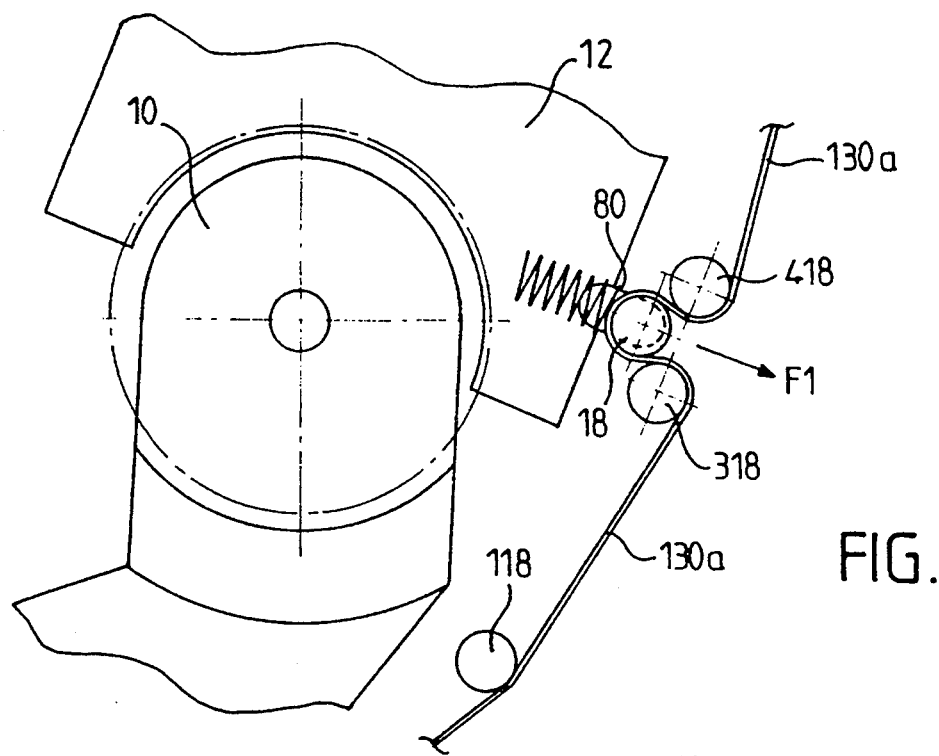
FIG. 10 is a side elevation view of the mechanism of FIG. 9 in the blockage position.

In some cases (FIG. 9), it is possible to fix in addition to the throughgoing tube 18 mounted on the seat back armature, throughgoing tubes 318, 418 mounted on the armature of the seating portion. The throughgoing tube 18 is then slidably mounted in windows 80 formed on either side of the seat back 4 in the gussets 16, 17. A resilient element 81 tends to bring the throughgoing tube 18 back to the position which is most remote from the throughgoing tubes 318, 418. As shown in FIG. 9, the throughgoing tube 18 is situated in a slanting plane parallel to the plane defined by the throughgoing tubes 318, 418; the tube 18 can effect a movement (direction of the arrow F1, FIG. 10), in a plane perpendicular to the two hereabove defined planes.

In the event of an impact (see FIG. 10), the tube 18 slides in the windows 80 of the gussets 16, 17 in the direction of the arrow F1 (FIG. 10) and then comes to bear against the throughgoing tubes 318, 418 by firmly blocking the lower run 130a of the safety belt, thereby causing an antagonistic torque cancelling any efforts applied on the seat back articulation mechanism 10 mounted on the upper extension 10.

Figure 11:
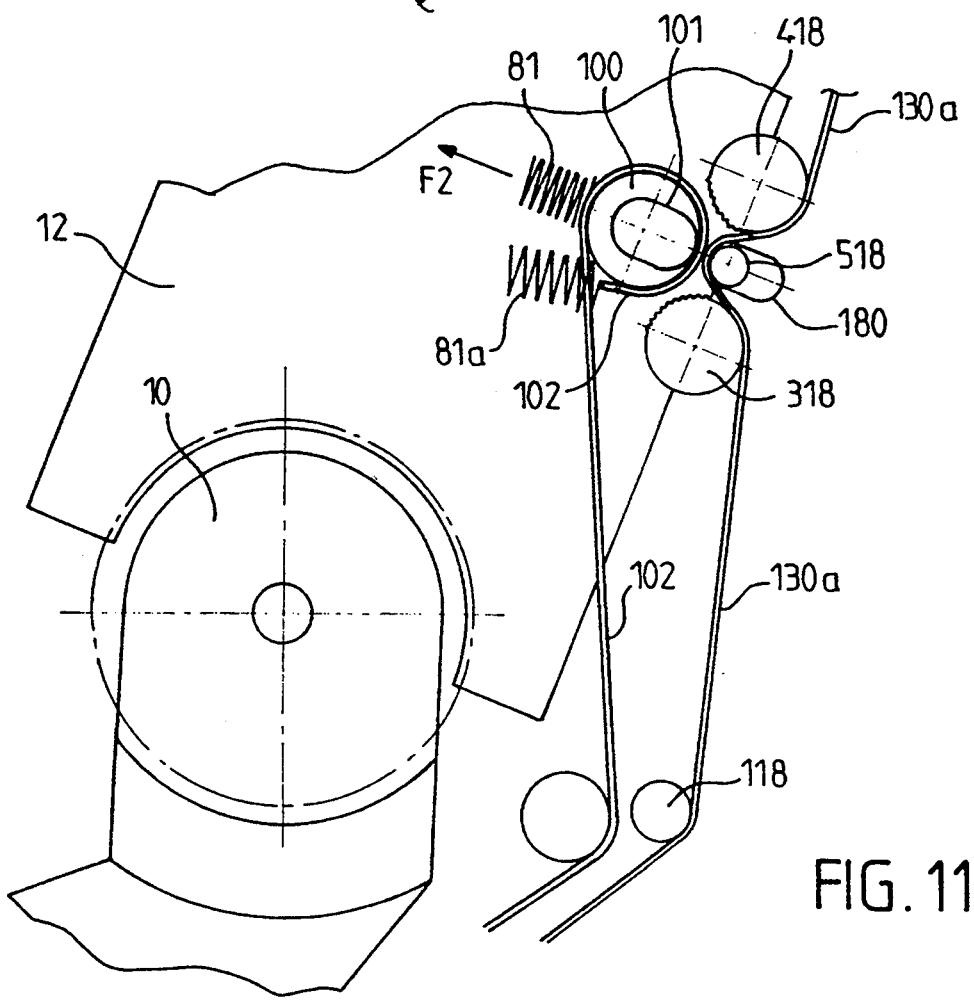
FIG. 11 is a side elevation view of a third embodiment of a portion of the safety belt.

In FIG. 11, there is provided in addition to the throughgoing tubes 318, 418 a throughgoing abutment 518 that slides in windows 180 formed in the gusset 16, 17. The abutment 518 cooperates with a cylinder 100 mounted in windows 101 also formed in the gussets 16, 17.

The cylinder 100, which has a tendency to be drawn inside (arrow F2) by a resilient element 81, carries a cable 102 that is wound around it and is retained under tension by a second resilient element 81a, this cable 102 being fixed at its lower end on the seat back armature 12.

Figure 12:
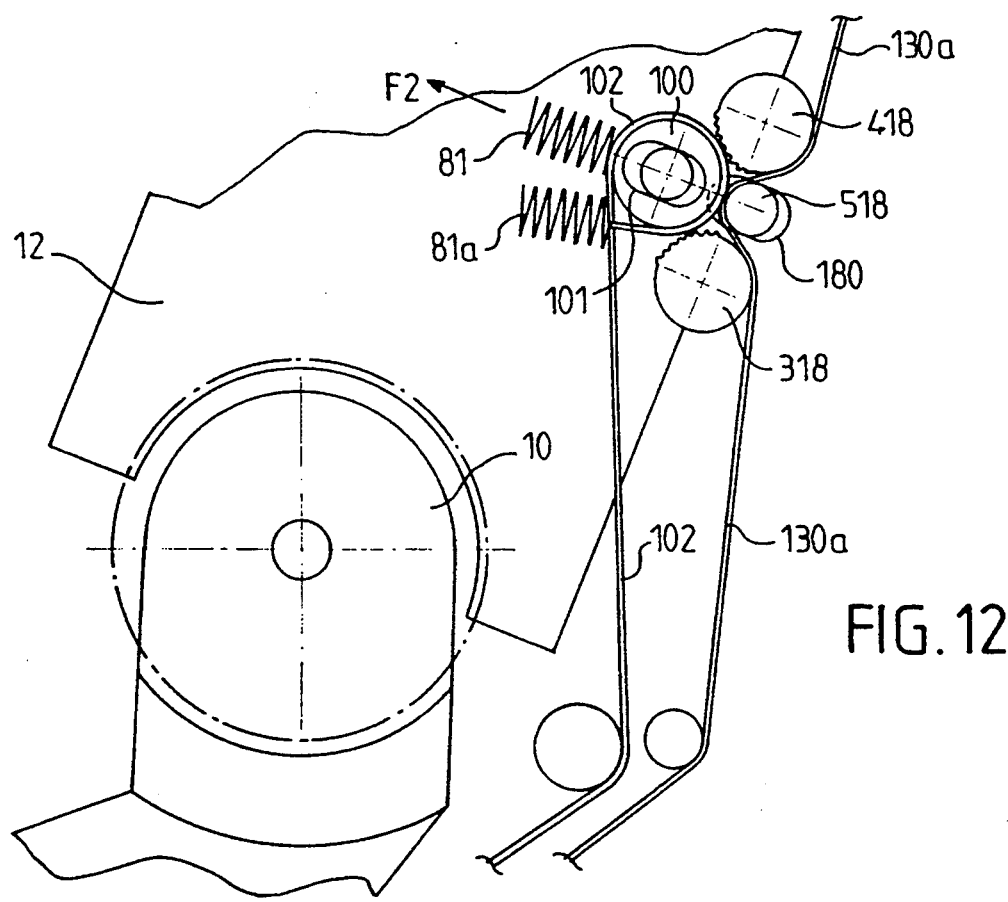
FIG. 12 is a side elevation view corresponding to FIG. 11 showing the mechanism in another position.

In the event of an impact (FIG. 12), the resilient element 81 is deformed; the abutment 518 thus drives the cylinder 100 and strongly blocks the cable 102, and this all the more that the throughgoing tubes 318, 418 are peripherally serrated so as to provide a good hold of the cable 102. There again, the result is the same as that previously explained.

Figure 13:
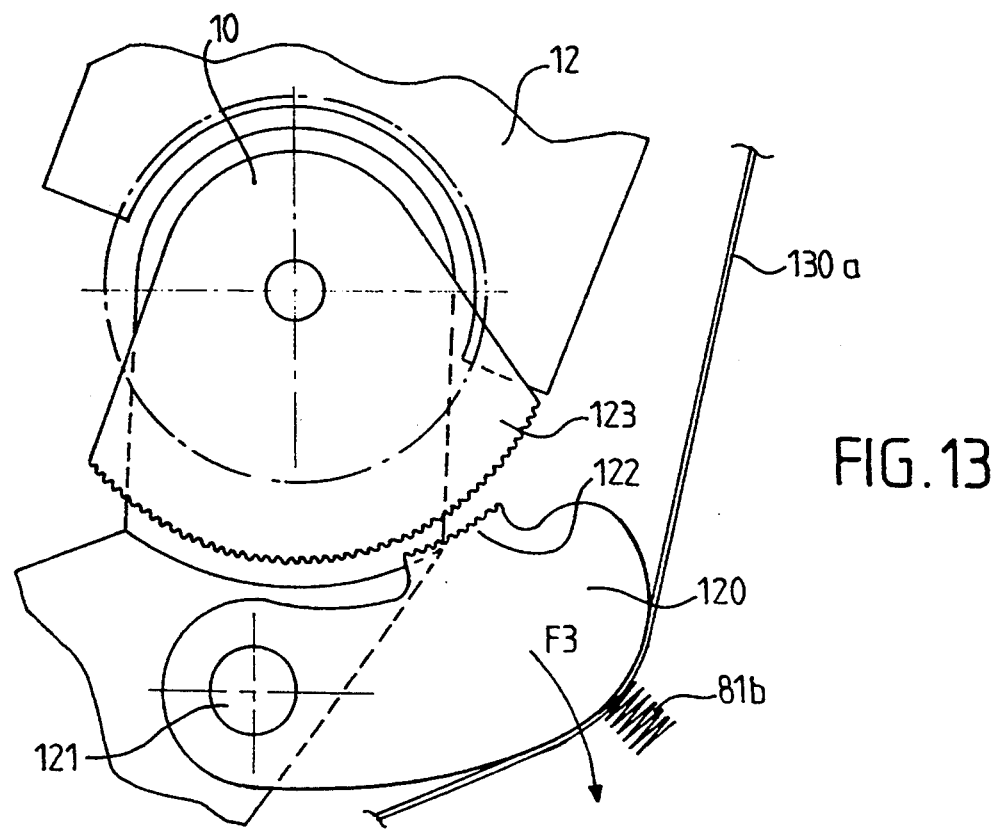
FIG. 13 shows a side elevation view of a modification of one of the members of the seat using a safety belt with three embarked points.

Finally, in FIG. 13, the lower run 130a of the safety belt, which comes for example from an automatic winder or is provided with any one of the blockage devices described in the preceding figures, passes along a segment in the shape of a shoe 120 that is articulated at 121 to the armature of the seating portion of the seat.

The front upper portion 122 of the segment 120 is serrated in order to cooperate with a toothed sector 123 fixed on the axis of articulation of each seat back articulation mechanism.

Figure 14:
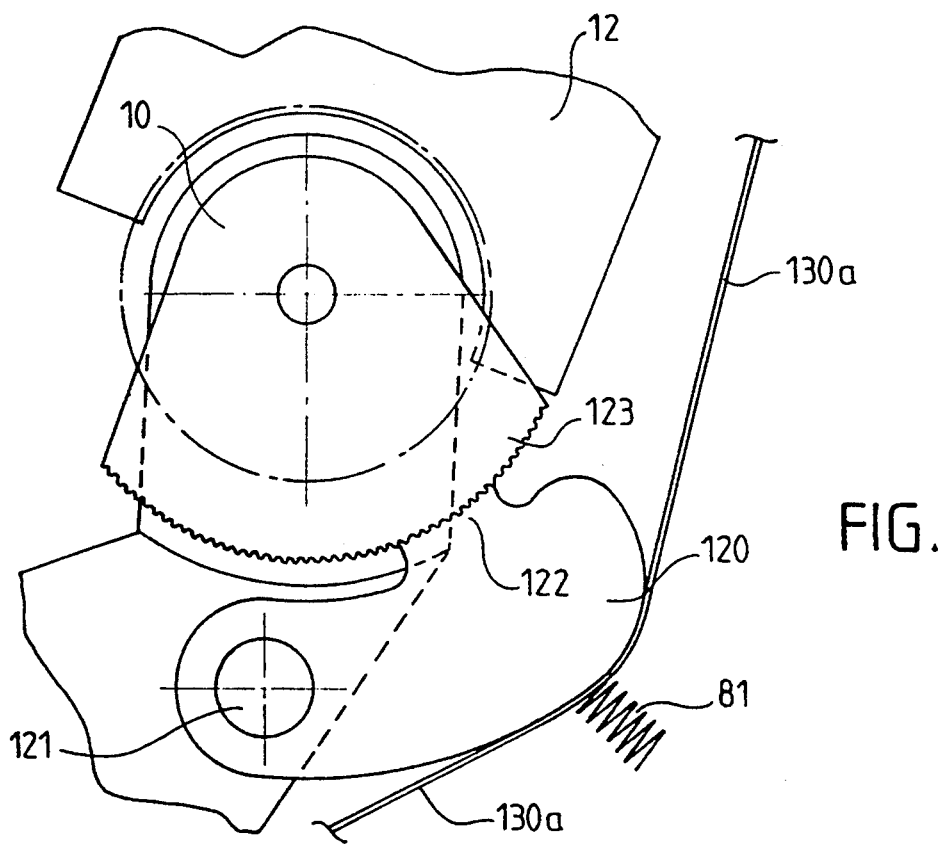
FIG. 14 is a side elevation view corresponding to FIG. 13 of the mechanism of this figure in another position.

There is also provided a resilient element 81b that has a tendency to bring rearwardly the sector 130 in the direction of arrow F3 (FIG. 13), but which is deformed in the event of an impact and, at that moment, the serration 122 extends into the teeth of the toothed sector 123 (FIG. 14), thereby blocking completely the axis of articulation of the seat back articulation mechanisms 12, so that the latter do not support any torque having a tendency to deform them.

Figure 15:
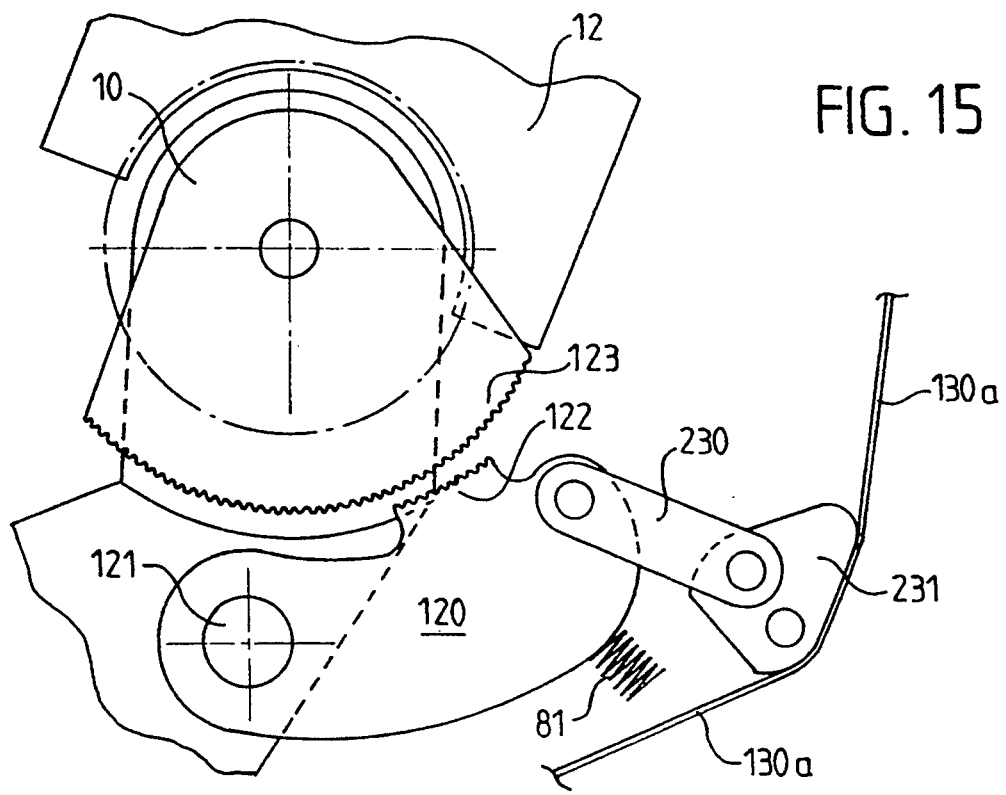
FIG. 15 is a side elevation view of a variant of FIG. 13.
Figure 16:
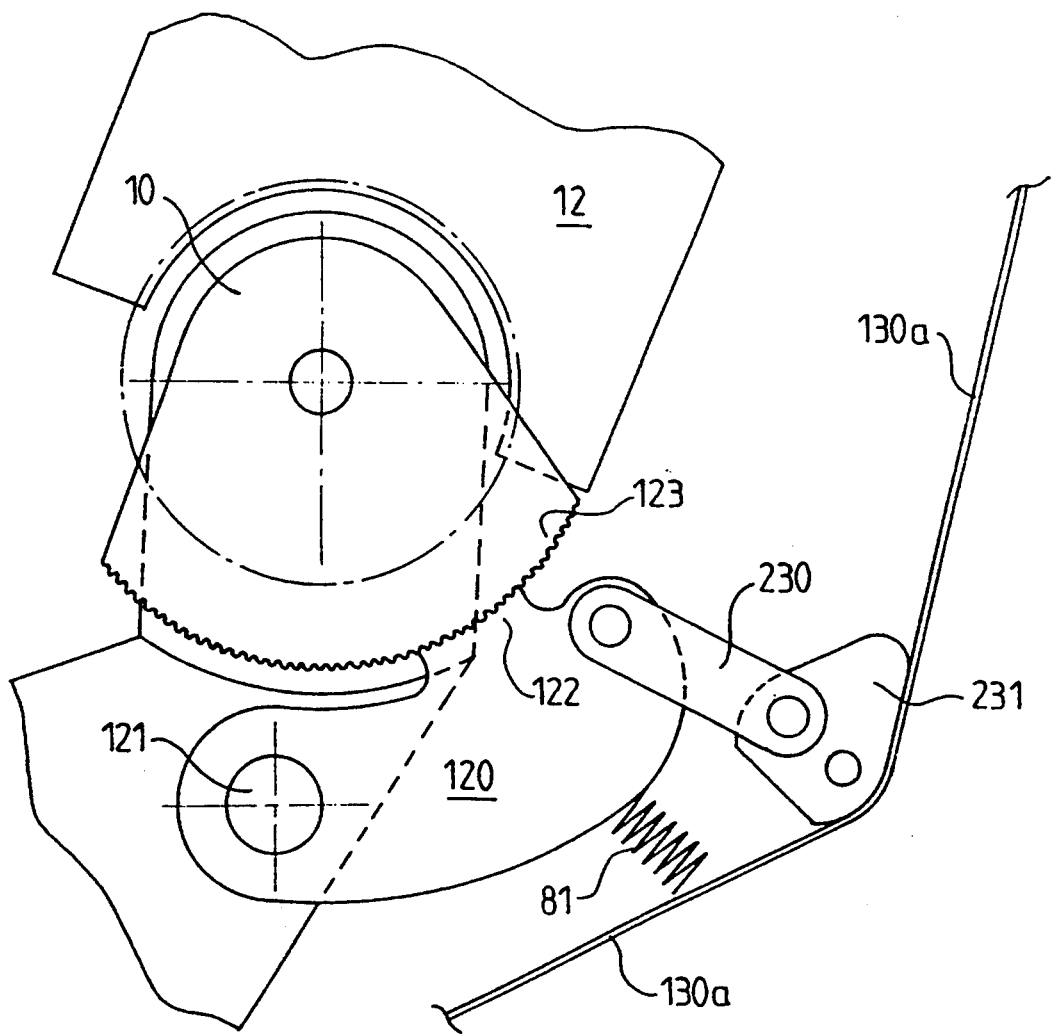
FIG. 16 shows the device of FIG. 15 in a side elevation view in another position.

In FIG. 15, the toothed segment 122 in the shape of a shoe is driven by a lever 230 controlled by a pad 231, on the outer surface of which will extend the run 130a of the safety belt so that, as explained for the previous cases, when there is an impact, the toothing 122 of the segment 120 will extend inside the toothing of the toothed sector 123 (see FIG. 16) so as to latch the seat back articulation mechanisms 12 and thereby avoid any destructive torque of the latter. This action causes a rubbing effect which increases the anchoring of the lower run 130A of the safety belt (FIG. 15). Finally, a lever 230 (FIG. 16) increases the force which blocks the shoe 120 on the toothed sector 123, the purpose of which on the run 130a of the belt 130 being the same as in FIG. 15.

Figure 4:
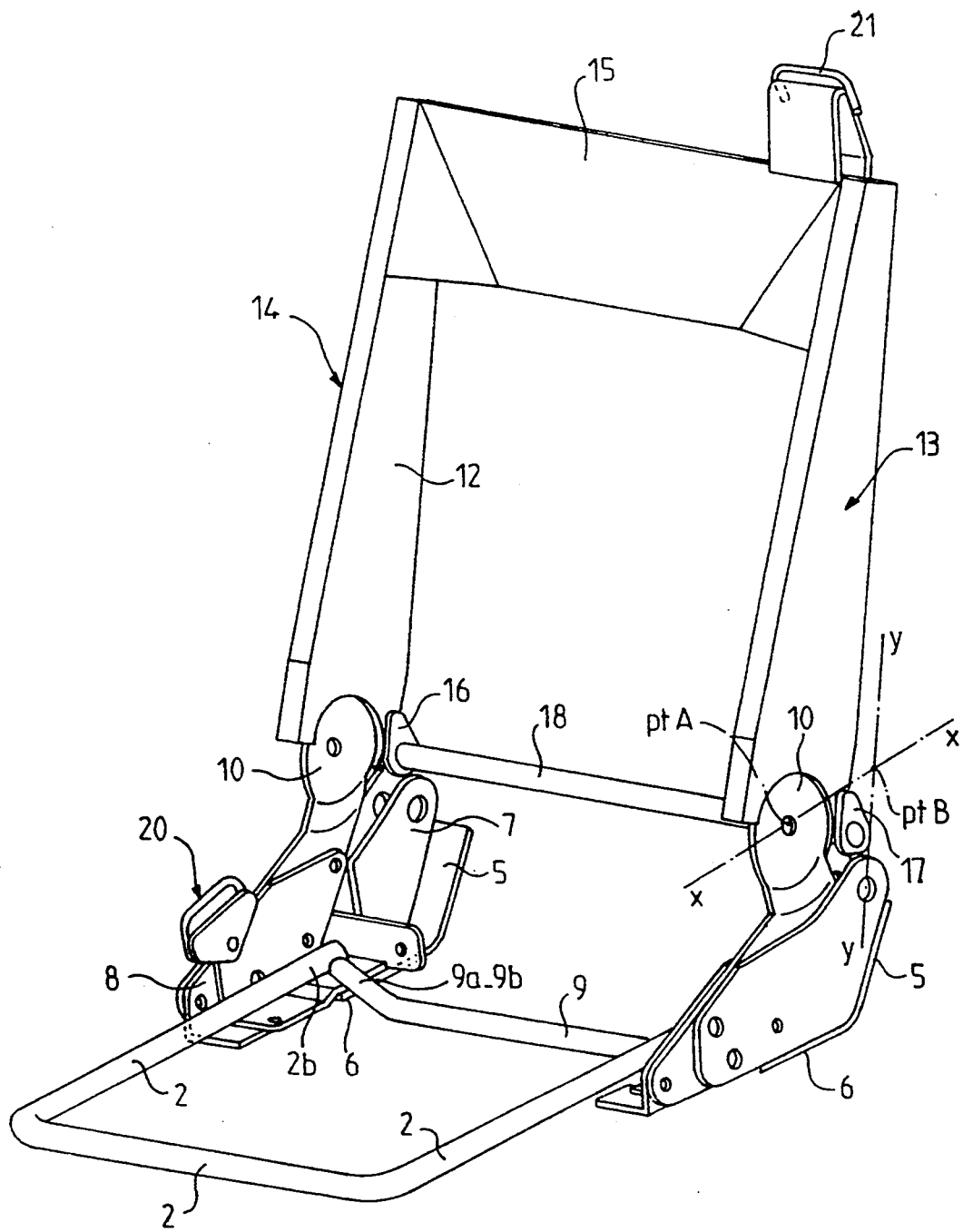
FIG. 4 is a front view corresponding to FIG. 3.
Figure 5B:
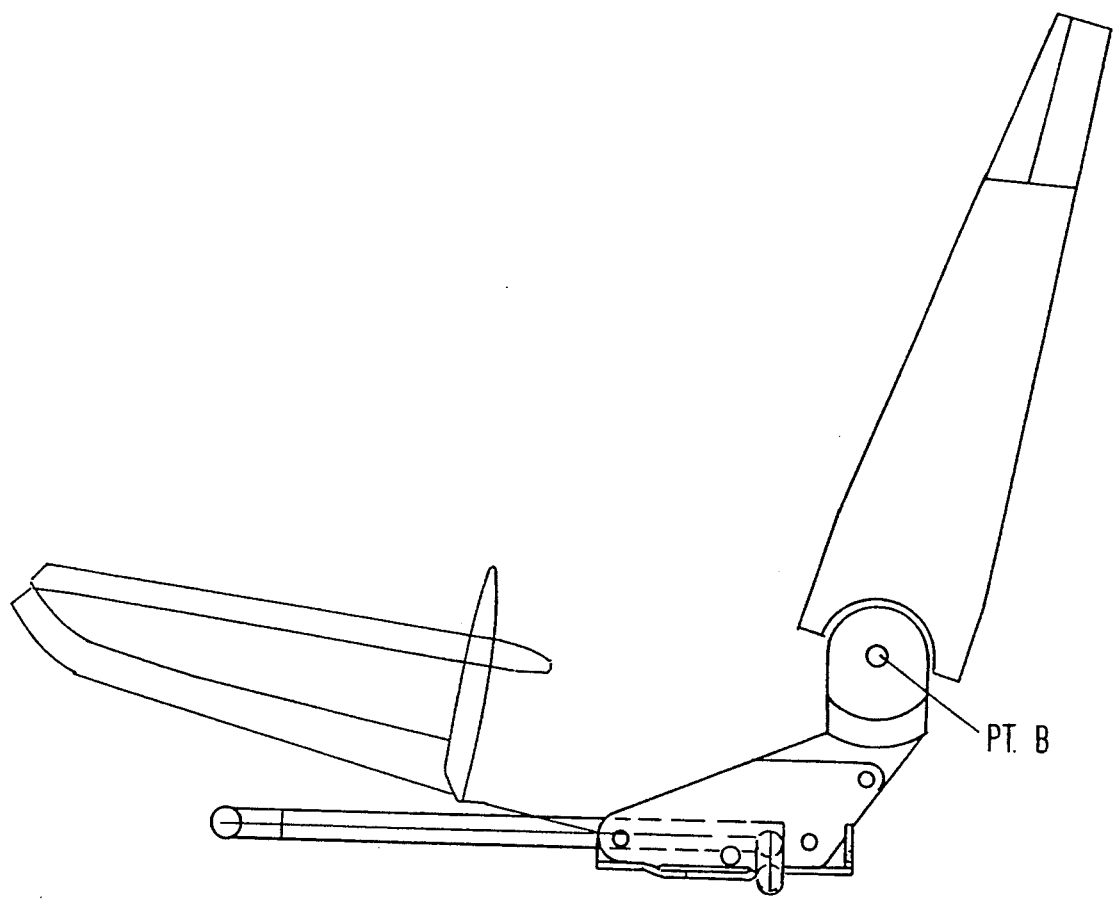
FIG. 5b shows a prior art arrangement with a conventional or normal pivoting point for the seat back inclination adjusting or articulation mechanism disposed at the rear end of the seating portion of the seat.

In all the embodiments of FIGS. 8 to 16, the articulation point A of the mechanisms for setting the inclination of the seat back in consideration occupies the same position as that defined for FIGS. 4 and 5.

Moreover, it is also possible to make safety belts of the parachute type with four embarked points but, in that case, the ventral run is made of two elements which are each connected to the rear lateral armature of the seating portion of the seat and the closing lock or buckle is in the middle of the ventral belt; this lock can also receive two catches fixed to the lower portion of the shoulder runs, as known. The mounting of each shoulder run is to conform to what has been previously described for the rear run 130a.

Finally, it should be noted that these embarked safety belts are provided with the known devices for adjusting the length of each run in consideration so as to set them as a function of the corpulence of the passenger.

The present invention is, of course, in no way restricted to the specific disclosure of the specification and drawings, but also encompasses any modifications within the scope of the appended claims.

I claim:

1. In a vehicle seat provided with a safety belt having fixation points embarked on a seat armature, the improvement wherein:

one end of a strap that forms said safety belt is fixedly connected, to form a first fixation point, to a rear lower portion of an armature of a seating portion of said seat via a blockage mechanism;

a shoulder keeper disposed on a seat back forward of an upper portion of a front face of said seat back provides for a sliding and guiding of a run of said safety belt strap above a passenger's shoulder;

another end of a further run of said safety belt strap is secured, to form a second fixation point, to a fitting that is fixed to side flange means on one side of said seating portion armature; and a further keeper that is disposed on said safety belt strap between said shoulder keeper and said fitting and that cooperates, to form a third fixation point, with a lock that is connected to side flange means on an opposite side of said seating portion armature, whereby both of said side flange means receive and mobile portions of articulation means for adjusting the position of said seat back relative to said seating portion of said seat, wherein said blockage mechanism of said safety belt strap is disposed rearwardly of said seat back and comprises spaced-apart throughgoing tubes that are disposed in two essentially parallel vertical planes and in three parallel horizontal planes between which runs of said strap are defined, with the component of the forces of said runs being such as to create an antagonistic force that produces a torque which considerably reduces the torque exerted on said articulation means, and wherein said two side flange means that receive said portions of said articulation means provide a pivot axis for said articulation means for adjusting the position of said seat back relative to said seating portion of said seat, with said pivot axis being disposed forward of a conventional pivot axis for such articulation means at a rear end of a seating portion armature.

2. A vehicle seat according to claim 1, wherein said pivot axis of said articulation means is disposed about 50 mm forward of a conventional pivot axis.

3. A vehicle seat according to claim 1, wherein runs of said safety belt strap enter said blockage mechanism in a first plane and exit the same in a second, different plane.

4. A vehicle seat according to claim 1, wherein said throughgoing tubes of said blockage mechanism are disposed such as to form the corners of an irregular triangle.

* * * * *

UNITED STATES PATENT AND TRADEMARK OFFICE
CERTIFICATE OF CORRECTION

PATENT NO. : 5,439,272
DATED       : Aug. 8, 1995
INVENTOR(S) : Hallet et al

It is certified that error appears in the above-identified patent and that said Letters Patent is hereby corrected as shown below:

On the title page:

[75]  Inventors:  Michel Hallet, Paris; Frédéric Degrenne, Ste Honorine la Chardonne, both of France Signed and Sealed this Twelfth Day of December, 1995

Attest:

BRUCE LEHMAN

Attesting Officer

Commissioner of Patents and Trademarks